United States Patent [19]

Mahnig et al.

[11] Patent Number: 4,556,234
[45] Date of Patent: Dec. 3, 1985

[54] CAST WHEEL FORK FOR MOTOR VEHICLE AXLE

[75] Inventors: Fritz Mahnig, Schaffhausen; Herbert Meister, Thayngen, both of Switzerland

[73] Assignee: Georg Fischer Aktiengesellschaft, Switzerland

[21] Appl. No.: 543,136

[22] Filed: Oct. 18, 1983

[30] Foreign Application Priority Data

Oct. 19, 1982 [CH] Switzerland ............... 6080/82

[51] Int. Cl.$^4$ ............................................. B60G 3/06
[52] U.S. Cl. ..................................... 280/688; 280/690; 280/797
[58] Field of Search ............... 280/688, 690, 707, 797, 280/800, 609, 698, 701

[56] References Cited

U.S. PATENT DOCUMENTS 2,297,123  9/1942  Almdale .......................... 280/797
2,838,322  6/1958  Felts et al. ...................... 280/797
4,478,430  10/1984  Maebayashi et al. ............ 280/690

Primary Examiner—Richard A. Bertsch
Attorney, Agent, or Firm—Roylance, Abrams, Berdo & Goodman

[57] ABSTRACT

A cast wheel fork for a motor vehicle axis comprises a arm having a wheel support at one longitudinal end and a bearing at an opposite longitudinal end. The arm has a substantially hat-shaped, transverse cross-sectional configuration formed by two substantially parallel arm members and a plurality of crossbars connecting the two arm members. The crossbars add strength to the arm profile and permit the wheel fork to be manufactured economically and to be lightweight.

9 Claims, 4 Drawing Figures

Fig. 3
Fig. 4
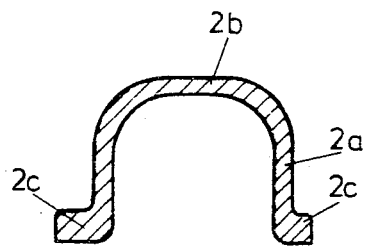
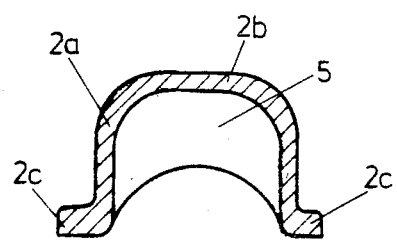

CAST WHEEL FORK FOR MOTOR VEHICLE AXLE

FIELD OF THE INVENTION

The present invention relates to a cast wheel fork for motor vehicle axles.

BACKGROUND OF THE INVENTION

Wheel forks, also known as swinging arms and control arms, form a part of a motor vehicle suspension system. Hollow cast wheel forks are conventional. However, since such conventional wheel forks are too heavy, they no longer satisfy present day requirements for economy.

Other conventional wheel forks are U-shaped in transverse cross section and are manufactured as welded structures. These wheel forks are disadvantageous due to their high manufacturing costs and limited dampening capacity.

SUMMARY OF THE INVENTION

An object of the present invention is to provide a cast wheel fork which is lightweight, simple and inexpensive to manufacture, and economical.

The foregoing object is basically obtained by a cast wheel fork for a motor vehicle axle comprising an arm, a wheel support at one longitudinal end of the arm, and a bearing at an opposite longitudinal end of the arm. The arm has a first longitudinal axis and a substantially hat-shaped, transverse cross-sectional configuration formed by first and second substantially parallel arms and a plurality of crossbars. The crossbars connect the arm members. The bearing extends along a second longitudinal axis.

By forming the wheel fork of the present invention in this manner, it is relatively strong, while being relatively lightweight. Additionally, the wheel fork is simple and inexpensive to manufacture by an open casting process.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIGS. 3 and 4 are end elevational views in section of the wheel fork of FIG. 1.

DETAILED DESCRIPTION OF THE PREFERRED EMBODIMENT OF THE INVENTION

Figure 1:
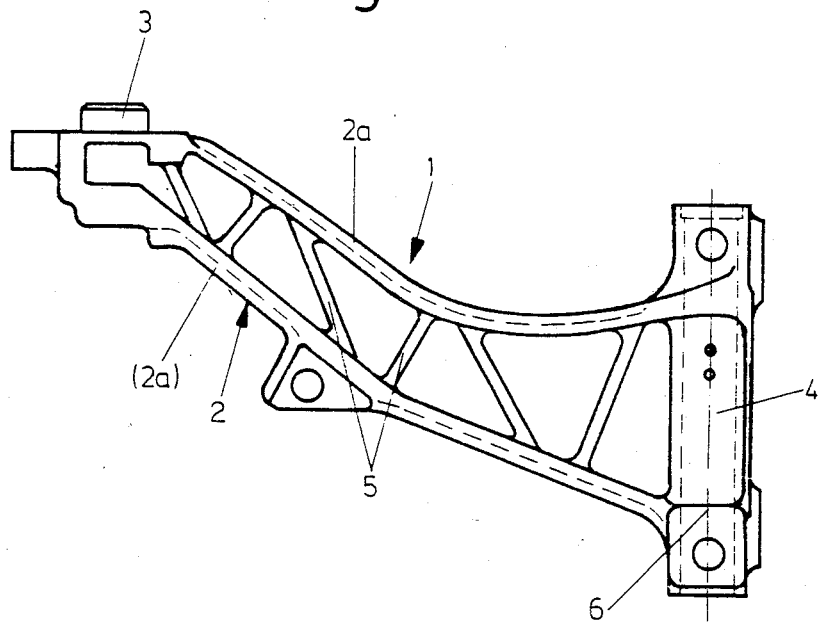
FIG. 1 is a bottom plan view of a wheel fork according to the present invention.
Figure 2:
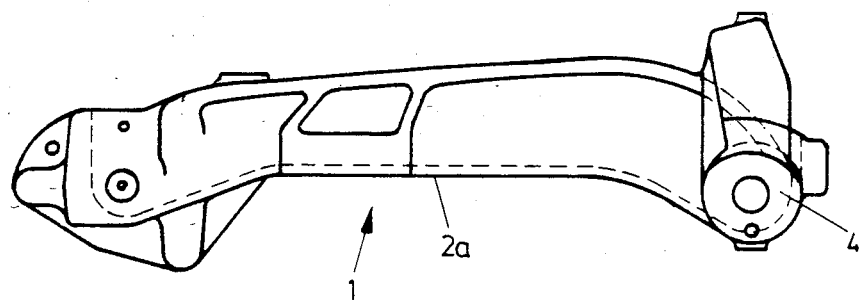
FIG. 2 is a side elevational view of the wheel fork of FIG. 1.

FIGS. 1 and 2 illustrate a wheel fork, swinging arm or control arm in the form of a "radius-arm" of the type used in the rear axle of a mini-truck. However, the invention is not limited to such vehicle or location and can be adapted to other vehicles and locations. Any type of longitudinal or transverse wheel fork can be manufactured in accordance with the present invention.

Wheel fork 1 comprises a wheel fork arm 2. One longitudinal end of fork arm 2 forms a wheel support 3, while the other longitudinal end of fork arm 2 forms a bearing 4. Bearing 4 attaches the fork arm to the vehicle's superstructure for relative movement therebetween.

Wheel fork arm 2 has a first longitudinal axis and a hat-shaped transverse cross-sectional configuration defined by first and second free arms or arm members 2a connected by web portions 2b and crossbars 5. The arm members are thicker at their free second ends 2c remote from the first ends attached to the crossbars. The number of crossbars provided is determined by the particular strength requirements dictated by the intended use of the wheel fork. Crossbars 5 are arranged such that each crossbar forms or extends at an acute angle relative to second longitudinal axis 6 of bearing 4. This crossbar arrangement counters forces, i.e., vertical, side and longitudinal forces, as well as brake momentum forces applied to the wheel fork.

Crossbars 5 are shorter than each arm member 2a of the hat-shaped wheel fork arm. The opposite first and second ends of each crossbar 5 are connected with an arm member 2a at a location which is somewhat higher than the middle portion of the crossbar lying between its ends. Additionally, the crossbar follows a path which is slightly curved toward the inside of the wheel fork arm profile in extending from the connection point on one arm member to the connection point on the opposite arm member.

The wheel fork comprising the arm members and crossbars is designed to be manufactured in an open casting process. In such process, a one-part mold is used without any top mold part such that the wheel fork is cast in a hollow space of the mold which is open at its top.

The materials which can be used to form the wheel fork of the present invention include cast iron with bead graphite, cast iron with vermicular graphite, and light metal alloys.

The cast wheel forks of the present invention can be manufactured at substantial cost savings resulting from the open mold process and the proper selection of material, and provide significant weight reduction, as compared to conventional wheel forks.

While a particular embodiment has been chosen to illustrate the invention, it will be understood by those skilled in the art that various changes and modifications can be made therein without departing from the scope of the invention as defined in the appended claims.

What is claimed is:

1. A cast wheel fork for a motor vehicle axle, comprising
   an arm having a first longitudinal axis and a substantially hat-shaped transverse cross-sectional configuration formed by first and second substantially parallel arm members and a plurality of crossbars connecting said arm members;
   a wheel support at one longitudinal end of said arm; and
   a bearing at an opposite longitudinal end of said arm, said bearing extending along a second longitudinal axis.

2. A cast wheel fork according to claim 1 wherein each of said crossbars extends at an acute angle relative to said second longitudinal axis.

3. A cast wheel fork according to claim 1 wherein said arm members have first ends connected by said crossbars and free second ends, each of said second ends having a transverse wall thickness greater than the respective first end.

4. A cast wheel fork according to claim 1 wherein said crossbars are thinner than walls forming said arm members.

5. A cast wheel fork according to claim 1 wherein each of said crossbars has a first end connected to said first arm member, a second end connected to said second arm member and a middle portion between said ends thereof, said ends of each of said crossbars being higher than said middle portion thereof.

6. A cast wheel fork according to claim 1 wherein said arm members and said crossbars are formed by an open casting process.

7. A cast wheel fork according to claim 1 wherein said arm members and said crossbars are formed of cast iron with bead graphite.

8. A cast wheel fork according to claim 1 wherein said arm members and said crossbars are formed of cast iron with vermicular graphite.

9. A cast wheel fork according to claim 1 wherein said arm member and said crossbars are formed of a light metal alloy.

* * * * *